United States Patent [19]

Tadokoro

[11] Patent Number: 4,573,492
[45] Date of Patent: Mar. 4, 1986

[54] DISCHARGE CONTROL VALVE

[75] Inventor: Yoshiharu Tadokoro, Sakai, Japan

[73] Assignee: Kurimoto, Ltd., Osaka, Japan

[21] Appl. No.: 632,773

[22] Filed: Jul. 20, 1984

[30] Foreign Application Priority Data

Aug. 12, 1983 [JP] Japan ................... 58-125110

[51] Int. Cl.⁴ .................. F16K 1/44; F16K 11/07
[52] U.S. Cl. .................. 137/239; 137/625.3; 137/625.38
[58] Field of Search ........ 137/625.38, 625.35, 137/625.3, 239

[56] References Cited

U.S. PATENT DOCUMENTS 1,998,239  4/1935  Irwin ............. 137/625.38 X
3,605,787  9/1971  Krogfoss et al. ... 137/625.38 X
4,024,891  5/1977  Engel et al. ...... 137/625.38 X
4,040,443  8/1977  Okada et al. ..... 137/625.38 X
4,375,821  3/1983  Nanao ............ 137/625.38 X Primary Examiner—Arnold Rosenthal
Attorney, Agent, or Firm—Flynn, Thiel, Boutell & Tanis

[57] ABSTRACT

A discharge control valve wherein the inside of a valve casing is partitioned by a pair of horizontal upper and lower partition walls into an upper chamber, an inlet chamber with an inlet port and an outlet chamber with an outlet port in the order named, and a hollow cylindrical valve body is provided which has opened upper and lower ends, penetrates both partition walls and is capable of vertically moving within said three chambers. An upper half portion of said valve body is made a shutter portion and a lower half portion thereof is made a discharge control portion with a number of small holes perforated in its peripheral wall. The height of both portions are made slightly higher than the height of the inlet chamber.

5 Claims, 7 Drawing Figures

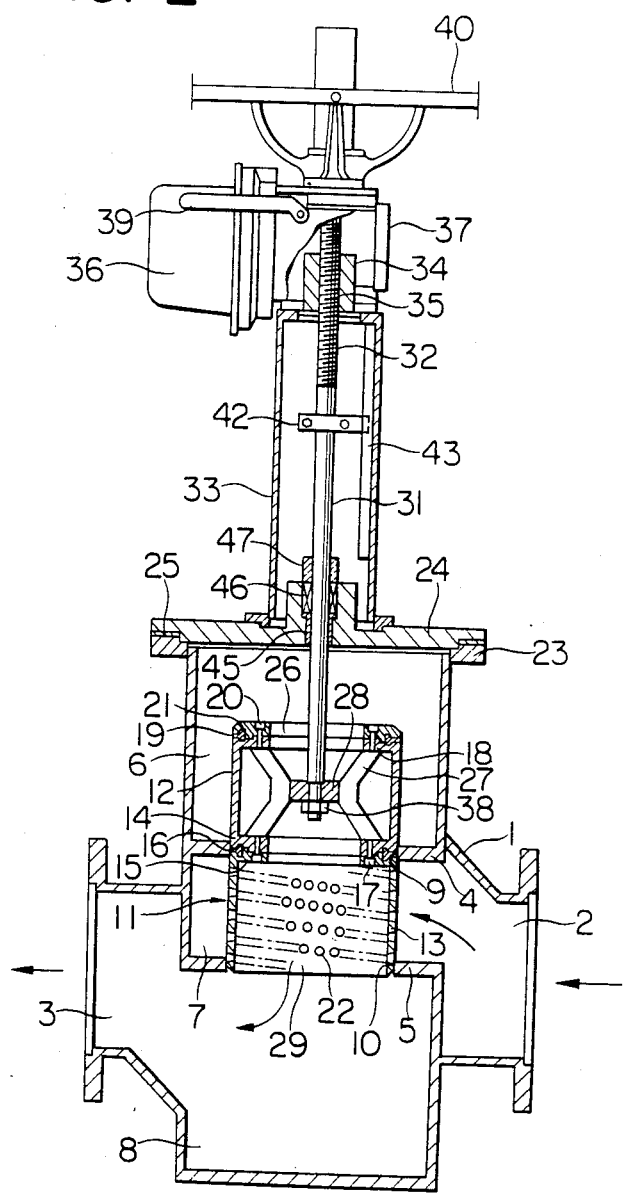

DISCHARGE CONTROL VALVE

FIELD OF THE INVENTION

This invention relates to a discharge control valve for use in, for instance, a water pipe discharge control, and in particular relates to a discharge control valve which is capable of wash-removing foreign substances, such as dust and the like, blocking a plurality of small holes formed in the peripheral wall of a globe valve type discharge control valve.

BACKGROUND OF THE INVENTION

As the valve of this type, there is known for instance the one disclosed in Japanese Utility Model Publication No. 36865/1982. In this valve 60, as shown in FIG. 1A to FIG. 1C, the stationary sleeve 64, whose inlet side has been closed, is fixed in the valve casing 63 having the inlet 61 and the outlet 62. Also, the movable sleeve 66 is fitted to this sleeve 64 slidably along the axial direction. In the peripheral wall of this sleeve 66 bridging from the axial middle portion to the inlet side, there are formed a plurality of tapered small holes 65 whose outer peripheral diameter is larger than the inner peripheral diameter, while the peripheral wall on the outlet side is solid. To this sleeve 66 there is attached the connecting rod 67 on the outside of the inlet side, and to this connecting rod 67 is further connected the tip of the working rod 68 which is provided slidably along the axial direction in the casing 63.

In the valve 60 as mentioned above, it takes place in the full-working state shown in FIG. 1A that when the sleve 66 is moved toward the right end position by the operation of the working rod 68, the fluid coming from the inlet 61 flows from the outside of the sleeve 66 through small holes 65 to the inside of the sleeve 66.

FIG. 1B indicates the non-working state where the sleeve 66 is transferred to the left side by the operation of the working rod 68, in which all the small holes 65 are closed by the outer periphery of the sleeve 64, and the small hole-free solid portion blocks the passage 69, thereby preventing the fluid from flowing out.

By moving the sleeve 66 between the position indicated in FIG. 1A and the position indicated in FIG. 1B, the number of opened small holes 65 is increased or decreased, and thus the flow rate is controlled.

When intending to remove the foreign substances having clogged some small holes 65, the sleeve 66 is moved toward the left end position indicated in FIG. 1C by the operation of the working rod 68. In this case, the fluid coming from the inlet 61 flows from the inside of the sleeve 66 through the small diameter portions of small holes 65 into the large diameter portions on the outside of the sleeve 66, whereby the foreign substances having clogged small holes 65 are pushed out thereof.

Even if a further large amount of fluid is hoped to be supplied on the downstream side urgently as the result of using for instance fire hydrants and the like provided in the downstream duct when the sleeve 66 is in the full-working state (FIG. 1A), the above mentioned valve can not comply with this demand, because the peripheral walls present between small holes 65 make a resistance against the fluid and consequently the resistance loss can not be lessened more than a fixed degree. In order to meet this demand, accordingly, it is necessary to move the sleeve 66 up to the middle position between the full-working position (FIG. 1B) and the washing position (FIG. 1C) and make the fluid flow between gaps formed between the front and rear outer peripheral surfaces of the sleeve 66 and the inner peripheral surface of the casing 63. In order to do so, however, it is required that the sleeve 66 should be first moved to the non-working position for stopping the flow of fluid and then moved up to said middle position, namely the sleeve 66 must be moved along a relatively long stroke. Accordingly, the aforesaid conventional valve has been observed to be disadvantageous in that it is impossible to change the flow rate from the non-working state to the high flow rate-flowing state while continuing the flow of fluid, and further it takes a relatively long period of time to attain said high flow rate, and in addition thereto when foreign substances have adhered to the outer periphery of the sleeve 66 they can not be removed with ease.

Still further, the aforesaid conventional valve has the following disadvantages. As the portion of the sleeve 66 having small holes 65 therein and the other solid portions are molded integrally, for instance when the relatively easy-to-damage portion is damaged the other portion, which is relatively difficult to damage and to which no damage has been caused yet, must be taken out together with said damaged portion for the repairing or exchanging purpose, and therefore materials are wasted and the expenses are increased.

SUMMARY OF THE INVENTION

It is an object of this invention to provide a discharge control valve which is capable of eliminating the aforesaid drawbacks inherent in the conventional discharge control valve; discharging the fluid at a high flow rate, readily as well as without discontinuing the flow of fluid at all, by moving a movable valve body at a relatively short period of time in the event of being demanded to discharge the fluid in a high rate in the full-working state; and further removing the foreign substances adhered to the outer periphery of said sleeve in a relatively easy manner.

According to this invention, the aforesaid object can be achieved by providing a discharge control valve including a valve casing that has an inlet port on one side and an outlet port on the other side and has its upper and lower portions closed, the inside of said casing having been partitioned, by a pair of upper and lower partition walls fixed horizontally to the inside wall of said valve casing leaving a fixed vertical distance therebetween, into an upper chamber, an inlet chamber with said inlet port and an outlet chamber with said outlet port in the order named; and a hollow cylindrical valve body with openings at its upper and lower ends that has been inserted axially slidably in a first passage hole and a second passage hole formed in said both partition walls and has protruded its valve shaft through an upper cover of the valve casing, a lower half portion of said valve body being made a discharge control portion with a great number of small holes formed in its peripheral surface, an upper half portion of the valve body being made a shutter portion whose peripheral wall is solid, characterized in that when the lower end outer peripheral surface of the discharge control portion slide-fits in the second passage hole the outer peripheral surface of the middle portion between the shutter and discharge control portions slide-fits in the first passage hole, when the upper end peripheral surface of said shutter portion slide-fits in the first passage hole the outer peripheral surface of the middle portion slide-fits in the second passage hole, when the lower end of said valve body abuts on the bottom wall of the outlet port the upper end of the valve body is located within the inlet chamber, and when the upper end of said valve body abuts on the upper cover the lower end of the valve body is located within the inlet chamber. In other words, when a large amount of fluid is demanded to be discharged at a high flow rate in the full-working state, wherein the lower end outer peripheral surface of the discharge control portion slide-fits in the second passage hole and the outer peripheral surface between the middle portion of the shutter and discharge control portions slide-fits in the first passage hole, this demand can be met in the manner of lifting the valve body directly from the present location of the formation of gaps between a lower end flange and the second passage hole and causing the fluid to discharge through said gaps, and further the foreign substances adhered to the outer periphery of the valve body are stripped from the outer peripheral surface of the valve body due to the sliding relation between the first and second passage holes and the outer peripheral surface caused by the vertical movement of the valve body and due to the increase in flowing velocity of the fluid caused when the fluid flows at a high flow rate, and is exhausted toward the outlet port.

It is another object of this invention is to provide a discharge control valve which requires exchanging only of the damaged portion of the valve body when the valve body has been damaged.

According to this invention, the aforesaid objects can be achieved by providing an embodiment wherein a valve body comprises a discharge control portion and a shutter portion made separately, and both portions being connected detachably to each other.

BRIEF DESCRIPTION OF THE DRAWINGS

FIG. 2 is a vertical front view illustrating the full-working state of one example of the discharge control valve according to this invention.

DETAILED DESCRIPTION OF THE INVENTION

Figure 1A:
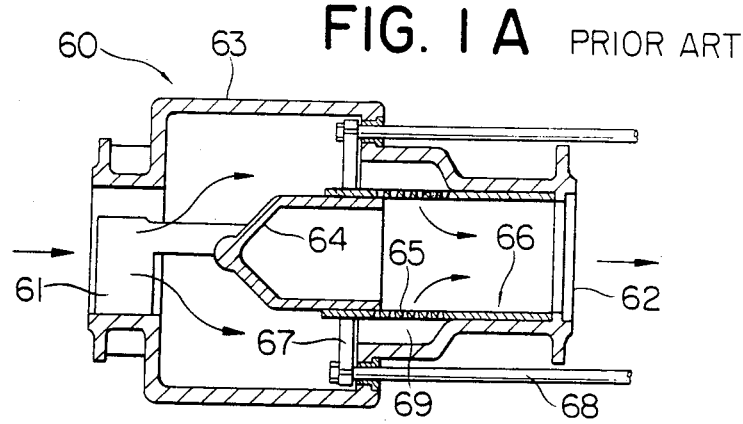
FIG. 1A is a sectional side view illustrating the full-working state of the usual typical discharge control valve.
Figure 1B:
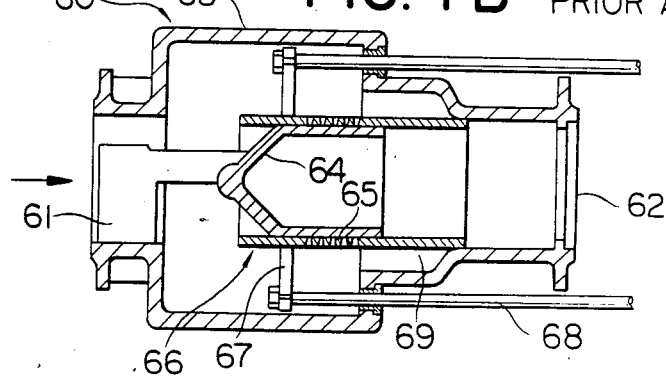
FIG. 1B is a sectional side view illustrating the non-working state of the discharge control valve shown in FIG. 1A.
Figure 1C:
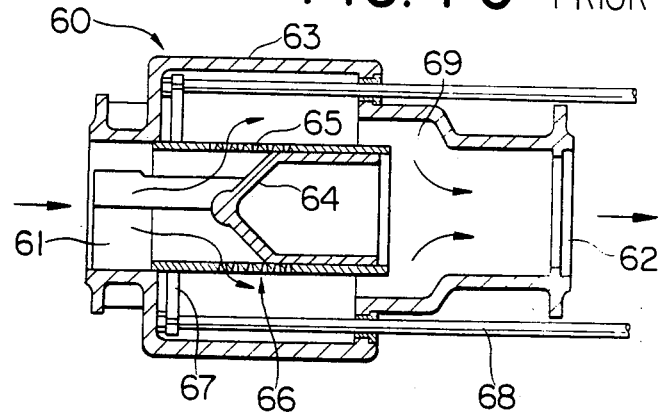
FIG. 1C is a sectional side view illustrating the washing state of the discharge control valve shown in FIG. 1A.

In FIG. 2, reference numeral 1 denotes a valve casing, a cover or top wall 24 being detachably mounted on a ring flange 23 of an upper opening portion of said casing through a ring seal 25 by means of a fixing means such as a bolt or the like (not shown), an inlet port 2 and an outlet port 3 being formed in both side walls of the casing respectively, and ducts (not shown) being attached to these ports. The interior of this valve casing 1 is partitioned by a pair of horizontal partition walls 4, 5 leaving a fixed vertical distance therebetween into an upper chamber 6, an inlet chamber 7 and an outlet chamber 8 in the order named from above. The partition walls 4, 5 are provided with a first passage hole 9 and a second passage hole 10 respectively.

A hollow cylindrical valve body 11 with openings 26, 29 at upper and lower ends respectively penetrates into the first passage hole 9 and the second passage hole 10 and is fit-inserted slidably into said holes in the vertical direction. The valve body 11 includes a shutter portion 12 located at the upper part and formed of a solid cylindrical wall body and a discharge control portion 13 located at the lower part and formed of a cylindrical wall body with a plurality of small perforated holes 22, the respective portions 12 and 13, as is apparent from FIG. 2 and FIG. 3, being slightly longer than the inlet chamber 7, the lower end inner periphery of the shutter portion 12 and the upper end inner periphery of the discharge control portion being provided with a ring flange 14 and a ring flange 15 respectively, and these ring flanges 14, 15 being connected detachably by means of a fixing means such as a bolt or the like while holding a seal ring 16 therebetween. The upper end inner periphery of the shutter portion 12 is provided with a projecting ring flange 18. A ring plate 21 is mounted on said ring flange 18 while holding a seal ring 19 therebetween and same is connected detachably by means of a bolt 20 or the like. Also, the thus formed valve body 11 is designed to have such a total height that when the lower end abuts on the surface of the bottom wall of the valve casing 1, the upper end is located within the inlet chamber 7 (FIG. 4) and when the upper end abuts on the inner face of a cover 24 (FIG. 5), the lower end is located within the inlet chamber 7. Reference numeral 27 denotes a rib provided within the shutter portion 12, and said rib is provided at its center with a valve shaft joint portion 28.

Reference numeral 31 denotes a valve shaft. This valve shaft 31 penetrates through the cover 24 and protrudes upward from the inside of the valve casing 1, the lower end of said valve shaft penetrating through the small holes formed in the joint portion 28 and being fixed to the joint portion 28 by means of a nut 38 or the like. The portion of cover 24 through which the valve shaft 31 penetrates is provided with a bush 45 and a seal ring 46. This seal ring 46 is held by a junk ring 47. The upper portion of the valve shaft 31 is provided with a male screw portion 32. This male screw portion 32 is in threaded engagement with a female screw portion 35 of a sleeve 34 provided rotatably in a casing 37 disposed on a stand 33 mounted on the cover 24. The sleeve 34 is designed to be rotated electrically or manually by means of either a motor 36 or a hand operating handle 40. Reference numeral 39 denotes a change lever used at that time. Reference numeral 42 denotes a stop lever attached to the valve shaft 31 and its front end is designed to slide vertically along a guide means 43 disposed within the stand 33.

Next, explanation will be made on the operation of the above mentioned discharge control valve.

Full-working state:

FIG. 2 illustrates the full-working state of said valve, wherein the shutter portion 12 of the valve body 11 is positioned within the upper chamber 6 and the discharge control portion 13 is positioned within the inlet chamber 7 by electrically or manually transferring the valve shaft 31. The fluid coming from the inlet port 2 flows in the valve body 11 through the small holes 22 formed in the discharge control portion 13, thereafter flows through a lower opening 29 of the valve body 11 and flows out of the outlet chamber 8 to the outside.

Flow rate-controlling state:

Although this state is not illustrated, when moving down the valve shaft 31 of the valve in the full-working state as mentioned above thereby to move down the valve body 11, the shutter portion 12 transfers to the inside of the inlet port 2 and simultaneously the small holes 22 of the discharge control portion 13, especially those present at the lower part thereof, gradually transfer to the outlet chamber, whereby the flow of fluid in the valve body 11 decreases gradually, and in contrast when moving the valve body 11 up again the flow rate can be increased.

During both states, the outer peripheral surface of the valve body 11 continues to slide along the inner peripheral surface of the second passage hole 10 formed in the lower partition wall 5, whereby there is no possibility that the fluid other than that passing through the small holes 22 passes through between both surfaces.

Figure 3:
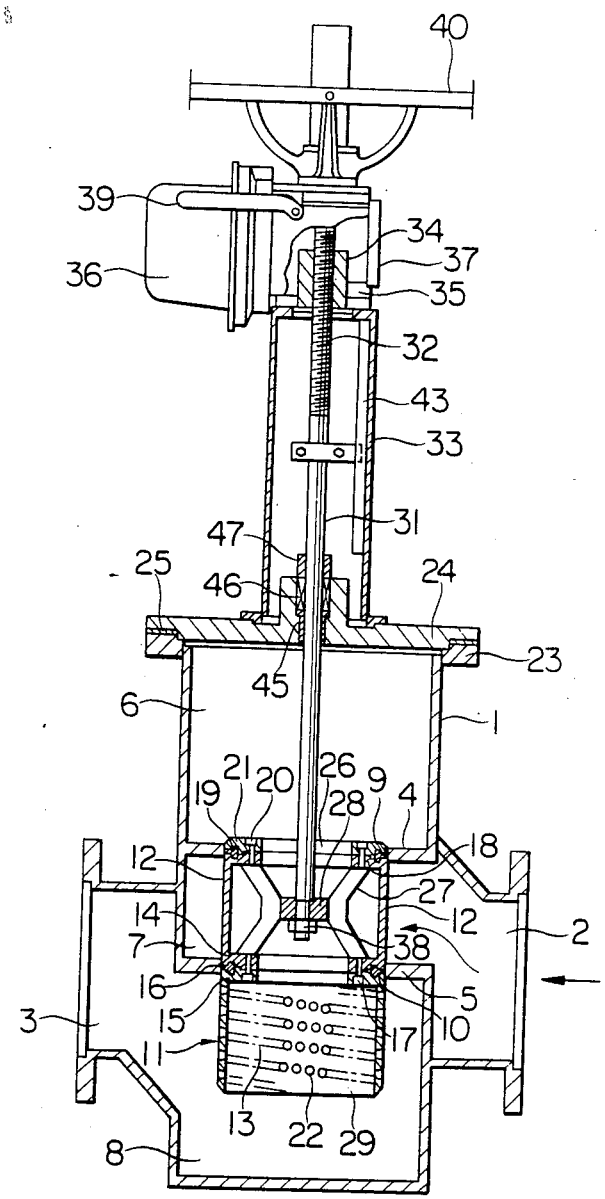
FIG. 3 is a sectional side view illustrating the non-working state of the example shown in FIG. 2.

Non-working state:

FIG. 3 illustrates this non-working state, wherein when the valve body 11 is kept moving down, it leads to that as shown in FIG. 3, in which the discharge control portion 13 is wholly located within the outlet chamber 8, the upper and lower end outer peripheries of the shutter portion 12 are coupled with the inner peripheral surfaces of the passage holes 9, 10, and the solid peripheral wall is located within the inlet chamber 7. As the result of this, the inlet chamber is isolated from the outlet chamber 8 by the shutter release portion 12. At this time, seal rings 16, 19 closely adhere to the inner peripheral surface of the passage holes 10, 9 to thereby prevent the fluid from leaking in the upper chamber 6 and the outlet chamber 8.

Figure 4:
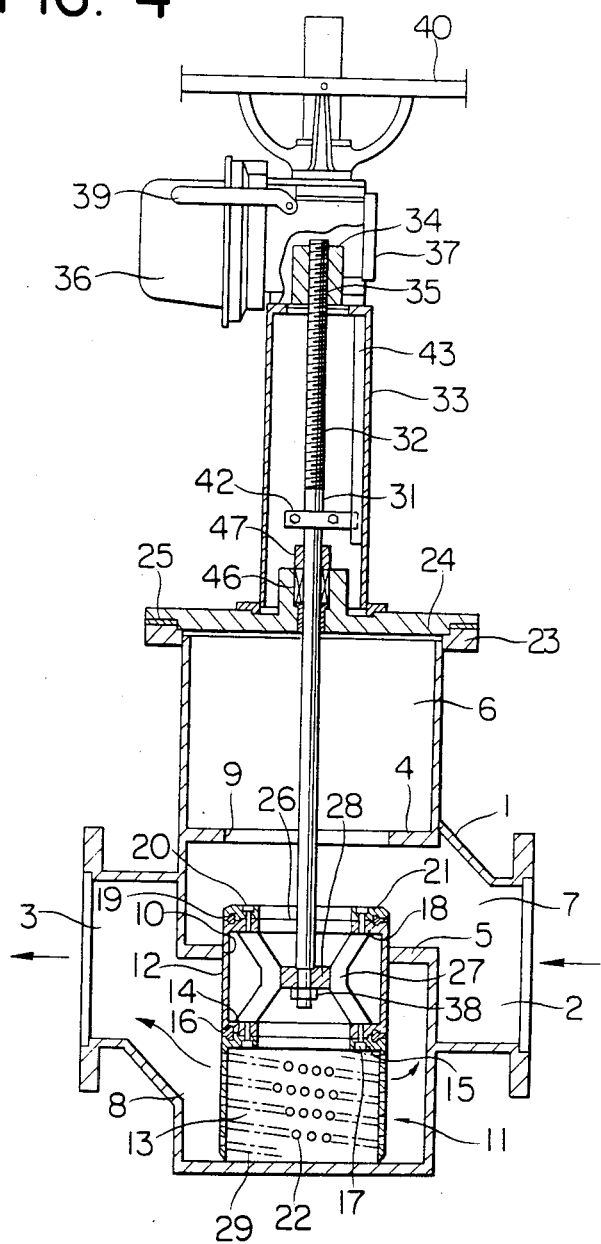
FIG. 4 is a sectional view illustrating the washing state of the example shown in FIG. 2.
Figure 5:
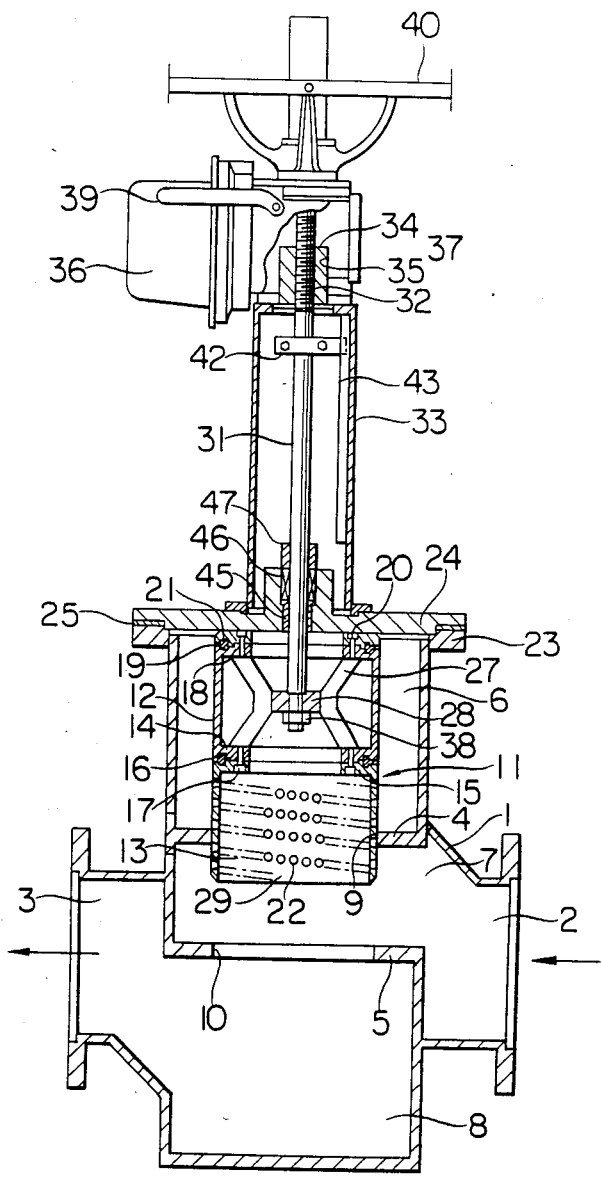
FIG. 5 is a vertical front view illustrating the high fluid flow state of the example shown in FIG. 2.

Washing state:

FIG. 4 illustrates this working state. In case it is required to wash the small hole 22 of the discharge control valve 13, the valve body 11 is moved lower than its position taken at the non-working state, and its lower end abuts on the bottom wall of the valve casing 1 thereby to shut the lower opening 29. By doing this, the upper opening 26 is positioned within the inlet chamber 7, whereby the fluid coming from the inlet port 2 flows from the opening 26 into the valve body 11, passes through the small hole 22 from its inner peripheral side to its outer peripheral side, and then flows out of the outlet chamber to the outside.

When the fluid passes through the small hole 22, since its outer peripheral side diameter is larger than its inner peripheral side diameter, the foreign substance having clogged the small hole 22 is washed off with ease.

High flow rate flowing state:

When a further high flow rate of fluid is required at the time of the full-working state, it is achieved as follows. That is, the valve shaft 31 is moved up and the valve body 11 is moved up thereby to separate its lower end immediately from the second passage hole 10 to form a gap thereat. A greater amount of fluid than that having passed through the small hole 22 flows in the outlet chamber 8 by utilizing this gap. The said amount increases gradually as the valve body 11 moves up, and reaches maximum in FIG. 5 wherein the upper end of the valve body 11 abuts on the cover 24. As is seen from the aforegoing, the transfer from the full-working state to the higher flow rate flowing state can be carried out continuously as well as in a short time by this invention. In addition, this invention is utterly free from the inherent disadvantage in the conventional valves that upon transferring, the flow must be stopped temporarily.

Upon transferring the valve body 11, as the outer peripheral surface of the valve body 11 is always in slide-contact with the inner peripheral surfaces of the passage holes 9, 10, the foreign substances adhering to the outer periphery of the valve body 11 come to be scraped off by the partition walls 4, 5, and come to be carried away by the fluid which increases rapidly with the rapidly increasing speed of current.

The invention has been described in detail sufficient to enable one of ordinary skill in the art to mare and use the same. It is believed that certain modifications and alterations of the preferred embodiment will occur to others upon a reading and understanding of the specification, and it is intended to include all such alterations and modifications as part of the invention, insofar as they come within the scope of the appended claims.

What is claimed is:

1. A discharge control valve, comprising: a valve casing which has an inlet port on one side and an outlet port on the other side and has means defining a chamber therein, said casing having upper and lower partition walls which extend horizontally across said chamber with a fixed vertical distance therebetween and divide said chamber into an upper chamber located above said upper partition wall, an inlet chamber located between said partition walls and in fluid communication with said inlet port, and an outlet chamber located below said lower partition wall and in fluid communication with said outlet port; and a cylindrical valve body having upper and lower ends and having a passageway which extends between and opens through said upper and lower ends, said valve body being axially slidable in first and second passage holes which are respectively provided in said upper and lower partition walls and which each have an annular surface adapted to slidably engage a cylindrical peripheral surface of said valve body, said valve body having an elongate, axially extending valve shaft which extends slidably and sealingly through an opening provided in a top wall portion of said valve casing at an upper end of said upper chamber, a lower portion of said valve body being a discharge control portion having a plurality of small holes in its peripheral surface which communicate with said passageway therethrough, and an upper portion of said valve body being a shutter portion having a peripheral wall which is free of openings therethrough; wherein when a lower end of said discharge control portion is axially aligned with said second passage hole a middle portion of said valve body between said shutter portion and said discharge control portion is axially aligned with said first passage hole; wherein when an upper end of said shutter portion is axially aligned with said first passage hole said middle portion is axially aligned with said second passage hole; wherein when said lower end of said valve body is engaging a bottom wall portion of said casing at a lower end of said outlet chamber said upper end thereof is within said inlet chamber at a location spaced below said upper partition wall; and wherein when said upper end of said valve body is engaging said top wall portion of said casing said lower end of said valve body is within said inlet chamber at a location spaced above said lower partition wall.

2. The discharge control valve according to claim 1, wherein said discharge control portion and said shutter portion of said valve body are separate parts, and wherein said valve body includes means for detachably connecting said discharge control portion and said shutter portion to each other.

3. The discharge control valve according to claim 1, wherein said holes in said discharge control portion of said valve body each taper progressively in cross-sectional area in a direction toward said passageway through said valve body.

4. A discharge control valve, comprising:

a valve casing having means defining a chamber therein, said chamber including an inlet chamber portion, an outlet chamber portion and a passage hole which provides fluid communication between said inlet and outlet chamber portions, said valve casing further including inlet and outlet ports which are respectively in fluid communication with said inlet and outlet chamber portions;

a valve body supported in said chamber in said casing for reciprocal movement, said passage hole having an annular surface which slidably engages an external peripheral surface of said valve body when said passage hole is axially aligned with a portion of said valve body, said valve body having first and second axially spaced openings and a passageway providing fluid communication between said first and second openings, and having between said first and second openings first and second portions of said peripheral surface which are axially offset, said first portion of said peripheral surface having at least one hole therein which is in fluid communication with said passageway and said second portion of said peripheral surface being free of holes which communicates with said passageway, said valve body being movable from a washing position successively through a closed position and a flow regulating position to a bypass position, wherein in said washing, closed and flow regulating positions respective portions of said valve body are disposed in said passage hole and said annular surface in said passage hole closely slidably engages said peripheral surface of said valve body, wherein in said bypass position said valve body is spaced from said passage hole and fluid can freely flow from said inlet chamber portion through said passage hole to said outlet chamber portion, wherein said first opening is in fluid communication with said outlet chamber portion in said closed and flow regulating positions and said casing includes means for substantially preventing fluid flow through said first opening in said washing position, wherein said second opening is in fluid communication with said inlet chamber portion in said washing position and said casing includes means for substantially preventing fluid flow through said second opening in said closed and regulating positions, and wherein said hole in said first portion of said peripheral surface of said valve body is in fluid communication with said outlet chamber portion in said washing position, is spaced axially from said inlet chamber portion in said closed position, and is in fluid communication with said inlet chamber portion in said flow regulating position; and means for effecting movement of said valve body within said chamber in said casing;

wherein said first portion of said peripheral surface of said valve body has a plurality of said holes therein which are axially offset, said holes successively coming into fluid communication with said inlet chamber portion as said valve body moves from said closed position to said flow regulating position;

wherein said casing includes a partition wall located between said inlet chamber portion and said outlet chamber portion, said passage hole being provided in said partition wall;

wherein said first and second openings are respectively provided in first and second axial ends of said valve body;

wherein said means for substantially preventing fluid flow through said first opening includes a surface on a side of said outlet chamber portion opposite said passage hole which said first axial end of said valve body sealingly engages in said washing position; and wherein said means for substantially preventing fluid flow through said second opening includes said chamber having a further chamber portion located on a side of said inlet chamber portion remote from said outlet chamber portion and includes said casing having a further passage hole which provides fluid communication between said inlet chamber portion and said further chamber portion and which has an annular surface which slidably engages said peripheral surface of said valve body when axially aligned with a portion thereof, said valve body being axially spaced from said further passage hole in said washing position and having respective portions disposed therein in said closed, flow regulating and bypass positions.

5. The discharge control valve according to claim 4, wherein said first mentioned passage hole and said further passage hole are circular; wherein said valve body is a cylindrical sleeve; and wherein said means for effecting movement of said valve body includes an elongate valve stem which extends substantially parallel to the direction of movement of said valve body, which has one end fixedly secured to said valve body, and which extends slidably and sealingly through an opening provided in said casing.

* * * * *